US007783439B2

(12) United States Patent
Kossel et al.

(10) Patent No.: US 7,783,439 B2
(45) Date of Patent: Aug. 24, 2010

(54) SIGNAL GENERATOR DEVICE AND DATA EYE SCAN SYSTEM

(75) Inventors: Marcel A. Kossel, Reichenburg (CH); Martin Leo Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 11/871,976

(22) Filed: Oct. 13, 2007

(65) Prior Publication Data

US 2008/0189063 A1 Aug. 7, 2008

(30) Foreign Application Priority Data

Oct. 13, 2006 (EP) ................................ 06122281

(51) Int. Cl.
*G06F 1/04* (2006.01)
*G06F 17/00* (2006.01)

(52) U.S. Cl. ............................ 702/67; 702/66; 702/79; 714/731; 714/744

(58) Field of Classification Search .................. 702/67, 702/66, 79, 72
See application file for complete search history.

(56) References Cited

U.S. PATENT DOCUMENTS

| | | | | |
|---|---|---|---|---|
| 5,371,766 | A * | 12/1994 | Gersbach et al. | 375/373 |
| 5,530,696 | A * | 6/1996 | Boggs et al. | 370/252 |
| 6,178,531 | B1 * | 1/2001 | Kolb | 714/715 |
| 6,192,035 | B1 * | 2/2001 | Boggs et al. | 370/252 |
| 6,728,311 | B1 | 4/2004 | Waschura | |

* cited by examiner

*Primary Examiner*—Hal D Wachsman
(74) *Attorney, Agent, or Firm*—Kenneth R. Corsello; Anne Vachon Dougherty

(57) ABSTRACT

A signal generator device for generating at least one periodic signal for use in a data eye scan system. The signal generator comprises a clock input, at least one output and at least one signal generator coupled with the clock input and with the output. The signal generator is at least one token ring with a predetermined number of positions and is operable to propagate at least one token in the ring by moving the token from its current position to a following position dependent on a clock signal from the clock input. The signal generator further comprises a predetermined number of signal value units that each represent a respective predetermined signal value of a predetermined signal waveform and are operable to provide the signal value at an output of the signal generator dependent on a current position of the at least one token in the token ring.

17 Claims, 4 Drawing Sheets

| PH_RES [degrees] | UI_RES | f_DCLK [GH$_2$] | N_LO | N_IF | f_RF [MH$_2$] | floor(f_DCLK/f_RF) | N_LO/4? N_IF/4? |
|---|---|---|---|---|---|---|---|
| 1 | 0.002778 | 6.25 | 71 | 431 | 73.52701 | 85 | no |
| 2 | 0.005556 | 6.25 | 71 | 251 | 63.12777 | 99 | no |
| 3 | 0.008333 | 6.25 | 41 | 161 | 113.6191 | 55 | no |
| 4 | 0.011111 | 6.25 | 38 | 398 | 148.7702 | 42 | no |
| 5 | 0.013889 | 6.25 | 37 | 109 | 111.5795 | 56 | no |
| 6 | 0.016667 | 6.25 | 38 | 278 | 141.9917 | 44 | no |
| 8 | 0.022222 | 6.25 | 38 | 218 | 135.804 | 46 | no |
| 9 | 0.025 | 6.25 | 38 | 198 | 132.908 | 47 | no |
| 10 | 0.027778 | 6.25 | 37 | 73 | 83.30248 | 75 | no |
| 12 | 0.033333 | 6.25 | 38 | 158 | 124.9167 | 50 | no |
| 15 | 0.041667 | 6.25 | 37 | 61 | 66.4599 | 94 | no |
| 18 | 0.05 | 6.25 | 36 | 356 | 156.0549 | 40 | yes |
| 20 | 0.055556 | 6.25 | 37 | 55 | 55.28256 | 113 | no |
| 24 | 0.066667 | 6.25 | 38 | 98 | 100.6982 | 62 | no |
| 30 | 0.083333 | 6.25 | 37 | 49 | 41.3679 | 151 | no |
| 36 | 0.1 | 6.25 | 36 | 196 | 141.7234 | 44 | yes |
| 40 | 0.0111111 | 6.25 | 37 | 370 | 152.027 | 41 | no |
| 45 | 0.125 | 6.25 | 36 | 164 | 135.5014 | 46 | yes |
| 60 | 0.166667 | 6.25 | 37 | 259 | 144.7876 | 43 | no |
| 72 | 0.2 | 6.25 | 36 | 41 | 21.17209 | 295 | no |
| 90 | 0.25 | 6.25 | 36 | 100 | 111.1111 | 56 | yes |

Fig. 3

| n | PH [degrees] | R_B(n) [Ω] | R_O(n) [Ω] | R_X(n) [Ω] |
|---|---|---|---|---|
| 0 | 0.00 | 10000 | 100.50 | 10000.00 |
| 1 | 10.00 | 10000 | 91.11 | 8129.95 |
| 2 | 20.00 | 10000 | 83.53 | 6622.89 |
| 3 | 30.00 | 10000 | 77.49 | 5420.20 |
| 4 | 40.00 | 10000 | 72.73 | 4473.71 |
| 5 | 50.00 | 10000 | 69.07 | 3745.42 |
| 6 | 60.00 | 10000 | 66.36 | 3206.38 |
| 7 | 70.00 | 10000 | 64.50 | 2835.51 |
| 8 | 80.00 | 10000 | 63.41 | 2618.49 |
| 9 | 90.00 | 10000 | 63.05 | 2547.05 |
| 10 | 100.00 | 10000 | 63.41 | 2618.49 |
| 11 | 110.00 | 10000 | 64.50 | 2835.51 |
| 12 | 120.00 | 10000 | 66.36 | 3206.38 |
| 13 | 130.00 | 10000 | 69.07 | 3745.42 |
| 14 | 140.00 | 10000 | 72.73 | 4473.71 |
| 15 | 150.00 | 10000 | 77.49 | 5420.20 |
| 16 | 160.00 | 10000 | 83.53 | 6622.89 |
| 17 | 170.00 | 10000 | 91.11 | 8129.95 |
| 18 | 180.00 | 10000 | 100.50 | 1000.00 |
| 19 | 190.00 | 10000 | 112.06 | 12300.20 |
| 20 | 200.00 | 10000 | 126.13 | 15099.14 |
| 21 | 210.00 | 10000 | 142.96 | 18449.50 |
| 22 | 220.00 | 10000 | 162.58 | 22352.82 |
| 23 | 230.00 | 10000 | 184.42 | 26699.29 |
| 24 | 240.00 | 10000 | 206.97 | 31187.78 |
| 25 | 250.00 | 10000 | 227.47 | 35267.04 |
| 26 | 260.00 | 10000 | 242.16 | 38189.96 |
| 27 | 270.00 | 10000 | 247.54 | 39261.08 |
| 28 | 280.00 | 10000 | 242.16 | 38189.96 |
| 29 | 290.00 | 10000 | 227.47 | 35267.04 |
| 30 | 300.00 | 10000 | 206.97 | 31187.78 |
| 31 | 310.00 | 10000 | 184.42 | 26699.29 |
| 32 | 320.00 | 10000 | 162.58 | 22352.82 |
| 33 | 330.00 | 10000 | 142.96 | 18449.50 |
| 34 | 340.00 | 10000 | 126.13 | 15099.14 |
| 35 | 350.00 | 10000 | 112.06 | 12300.20 |

Fig. 4

SIGNAL GENERATOR DEVICE AND DATA EYE SCAN SYSTEM

The present application claims priority from European patent application EP06122281.6 filed on 13 Oct. 2006.

TECHNICAL FIELD

The present invention relates to a signal generator device and particularly to a sine signal generator device. The present invention further relates to a data eye scan system for measuring eye diagrams in a high-speed serial link.

BACKGROUND OF THE INVENTION

U.S. Pat. No. 6,728,311 B1 discloses an apparatus and a method for creating an eye diagram that defines the characteristics of a bit stream of binary pulses. The apparatus comprises measuring means for sampling pulse voltage levels in excess of a variable voltage threshold during each of delayed clock pulses for a series of pulses of the binary pulse bit stream. The apparatus further comprises control means coupled to the measuring means for generating a series of the variable voltage threshold levels and the delayed clock pulses. Multiple counts of the sampled pulse voltage levels are accumulated during each delayed clock pulse for a series of pulses of the binary pulse bit stream. The accumulated counts are processed to generate the eye diagram.

It is a challenge to provide a signal generator device that is simple to implement and precise for generating at least one periodic signal and particularly for generating a sine signal. It is a further challenge to provide a data eye scan system that is simple to implement and precise for measuring eye diagrams.

SUMMARY OF THE INVENTION

According to a first aspect of the invention, a signal generator device for generating at least one periodic signal is provided. The signal generator device comprises a clock input, at least one output and at least one signal generator unit that is coupled with the clock input and with the at least one output. The at least one signal generator unit comprises at least one token ring with a predetermined number of positions that is operable to propagate at least one token in the at least one token ring by moving the at least one token from its current position to a following position dependent on a clock signal provided at the clock input. The at least one signal generator unit further comprises a predetermined number of signal value units that each represent a respective predetermined signal value of a predetermined signal waveform and that are operable to provide the respective predetermined signal value at least one output of the signal generator unit dependent on a current position of the at least one token in the at least one token ring.

The predetermined waveform may preferably be a sine waveform so that the at least one signal generator unit is adapted to generate a sine signal. The implementation of the signal generator device can be particularly simple, if the predetermined number of predetermined signal values and the predetermined number of positions in the at least one token ring are equal. Preferably, one cycle of the at least one token ring represents one period of the predetermined signal waveform, particularly one period of a sine waveform. The period of the signal waveform is thus divided into a number of discrete time steps or phase steps equal to the predetermined number of positions. The sequence of predetermined signal values associated to all positions of the at least one token ring thus represents a sampled version of the predetermined signal waveform.

It is an advantage that the signal generator device can be implemented as a predominantly digital circuit, preferably as an integrated digital circuit. By this, the signal generator device is easily portable between different semiconductor technologies and can be integrated with other circuits, particularly within a data eye scan system and a transmitter and/or receiver circuit for a serial link. Due to the at least one token ring with its predetermined number of positions and the predetermined number of signal value units the resulting layout of the circuit is highly repetitive and the implementation of the signal generator device is simple. A further advantage is that the frequency of the at least one generated periodic signal depends on the frequency of the clock signal and that it changes accordingly. However, no extra jitter is introduced by the signal generator device. The at least one generated periodic signal thus has a very precise timing.

According to a preferred embodiment the at least one signal generator unit comprises at least two outputs and the at least one signal generator unit is operable to provide at each of its outputs signal values generated in distinct signal value units that represent a predetermined phase difference in respect to the predetermined signal waveform. This allows for generating two or more signals with a fixed phase relation to each other with only one token ring and one sampled signal waveform. The implementation of the signal generator device can thus be very efficient in regard to area and power consumption.

In this respect, it is advantageous, if the predetermined phase difference between the at least two predetermined signal values represents a quarter of a period of the predetermined signal waveform. Particularly, with respect to a sine waveform, the predetermined phase difference represents 90 degrees. This enables simultaneous generation of in-phase and quadrature-phase signals with one token ring and one sampled signal waveform.

In this respect, it is further or alternatively advantageous, if the predetermined phase difference between the at least two predetermined signal values represents half a period of the predetermined signal waveform. Particularly, with respect to a sine waveform, the predetermined phase difference represents 180 degrees. This enables simultaneous generation of differential signals with one token ring and one sampled signal waveform. Particularly, differential in-phase and differential quadrature-phase signals can be generated very efficiently in regard to area and power consumption.

According to a further preferred embodiment the at least one token ring comprises at least one clocked flip flop at each of its positions and the at least one clocked flip flop of each position is coupled with its input to an output of the at least one clocked flip flop of the preceding position and with its output to an input of the at least one clocked flip flop of the following position in the at least one token ring and the clock input of the signal generator device is coupled with a clock input of the clocked flip flops. The state of the respective clocked flip flop depends on currently holding or not holding the at least one token. The at least one token can automatically and endlessly propagate from position to position of the at least one token ring dependent on the clock signal. This enables the implementation of the signal generator device with a simple and regular layout.

In this respect, it is advantageous, if the signal generator device comprises a first and a second token ring. The clocked flip flops of the first token ring are operable to propagate the at least one token on a rising edge of the clock signal or a signal derived from the clock signal. The clocked flip flops of the second token ring are operable to propagate the at least one token on a falling edge of the clock signal or the signal derived from the clock signal. The advantage is that a faster operation is possible. Twice as many signal values can be processed which results in a finer granularity of the at least one generated periodic signal.

According to a further preferred embodiment, at least one token in the at least one token ring is represented by a predetermined binary sequence of logic states of at least two positions in the at least one token ring and the predetermined binary sequence comprises at least two equal logic states representing an activated state. The at least one signal generator unit comprises a combinatorial network that is coupled with its inputs with each position of the at least one token ring and with its outputs with each signal value unit. The combinatorial network is operable to respectively associate at least two positions in the at least one token ring with at least one of at least two distinct signal value units dependent on the logic states of the at least two positions. The respective token is thus coded by its predetermined binary sequence of logic states. This enables to easily differentiate between tokens depending on their individual binary sequence of logic states, if more than one token is propagated in the same token ring. This is particularly advantageous for generating in-phase and quadrature-phase signals with the same signal generator unit. Preferably, the at least one token is represented by the predetermined binary sequence of logic states of at least two consecutive positions in the at least one token ring.

According to a further preferred embodiment each signal value unit comprises a voltage divider that is dimensioned to provide an output voltage that represents the predetermined signal value of the respective signal value unit. This enables a precise and jitter-free representation of the respective predetermined signal value. A further advantage is, that the respective voltage divider is simple to implement and can be efficient in regard to area and power consumption.

In this respect, it is advantageous, if the voltage divider comprises a base resistor, an offset resistor and a signal swing resistor that are arranged in series and the output voltage of the voltage divider is provided at a node between the signal swing resistor and a serial arrangement of the base resistor and the offset resistor. This has the advantage that an offset voltage and a signal swing can be easily adjusted by choosing the appropriate combination of resistor values.

According to a further preferred embodiment each signal value unit comprises at least one signal value switch that is coupled with the output of the respective voltage divider and with the at least one output of the at least one signal generator unit. The at least one signal generator unit comprises a combinatorial network that is coupled with its inputs with the outputs of the clocked flip flops and with its outputs with a respective control input of the at least one signal value switch of each signal value unit. This allows a simple implementation.

According to a further preferred embodiment an interpolator unit is provided electrically between each of two consecutive signal value units and that is operable to interpolate between the predetermined signal values of a first and a following second of the respective two consecutive signal value units. This enables to provide a smooth transition between predetermined signal values provided at the respective output. Instead of a time-discrete output signal a time-continuous output signal can be provided. This is particularly advantageous for generating time-continuous sine signals. The generation of time-continuous sine signals is particularly advantageous for use of the signal generator device in a data eye scan system.

In this respect, it is advantageous, if each interpolator unit comprises an interpolator capacitor and an interpolator switch and each interpolator unit is operable to couple the interpolator capacitor with the first or with the second of the respective two consecutive signal value units dependent on the current position of the at least one token. This enables a particularly simple implementation of the signal generator device.

According to a further preferred embodiment the at least one signal generator unit comprises a token generator that is coupled with the at least one token ring and wherein a phase of the at least one generated periodic signal is selectable by injection of the at least one token at a corresponding position in the at least one token ring when starting the signal generation. By this, the phase of the at least one generated periodic signal with respect to the clock signal can easily be selected by selecting the appropriate position in the at least one token ring for injection of the respective token generated by the token generator. When used in a data eye scan system, a finer resolution for scanning the data eye can be achieved by shifting the phase of the at least one generated periodic signal.

According to a further preferred embodiment the signal generator device comprises at least two signal generator units with a different predetermined number of positions in their at least one token ring and a frequency converter. The at least two signal generator units are coupled with their outputs with inputs of the frequency converter and an output of the frequency converter is coupled with the at least one output of the signal generator device. This enables a deterministic relationship between the clock signal at the input of the signal generator device and the at least one periodic signal at the at least one output of the signal generator device. The at least one generated periodic signal changes its frequency accordingly with the clock signal. A further advantage is that a ratio of the clock signal and the frequency of the at least one generated periodic signal can be a fractional number. This particularly enables the generation of an asynchronous sampling clock for use in a data eye scan system.

In this respect, it is advantageous, if the frequency converter comprises a single side band mixer with suppressed carrier signal for frequency conversion. This enables a precise frequency conversion without generating unwanted harmonics. If the at least two signal generator units are adapted to generate differential in-phase and differential quadrature-phase signals the frequency converter can be implemented with particularly low area and power consumption.

According to a further preferred embodiment the frequency converter comprises at least one interpolation filter. By this, a smooth and time-continuous output signal can be provided. This is particularly advantageous, if the predetermined signal waveform is a sine waveform. A further advantage is that the at least one generated periodic signal is particularly suitable for generating an asynchronous sampling clock for use in a data eye scan system.

According to a second aspect of the invention, a data eye scan system is provided that comprises the signal generator device according to the first aspect of the invention for generating a sampling clock signal. This enables precise, high-resolution and reliable scanning of a data eye for measuring data eye diagrams. A further advantage is that the data eye scan system can be implemented as a predominantly digital circuit that is efficient with respect to area and power consumption. With the data eye scan system a precise and reliable on-chip sampling scope or built-in self-test can be provided, particularly for use in high-speed serial link transmitters and/or receivers. The data eye scan system can be implemented with the transmitter and/or receiver on the same chip. The eye diagram can be measured at runtime with user data.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 3, a first table,

FIG. 4, a second table and

DETAILED DESCRIPTION OF THE DRAWINGS

Figure 1:
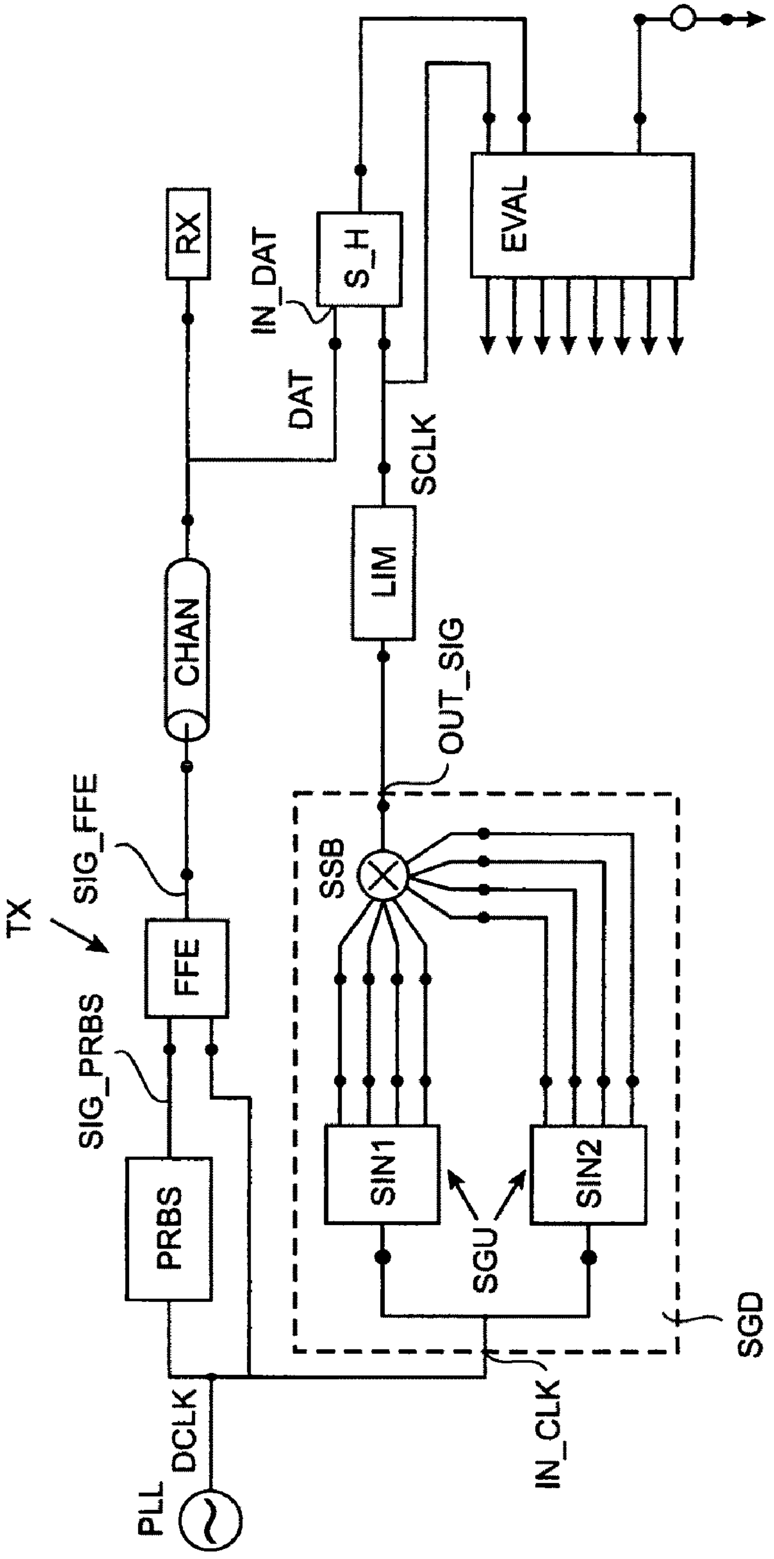
FIG. 1, a first block diagram of a data eye scan system.

FIG. 1 shows a first block diagram of a data eye scan system. The data eye scan system comprises a signal generator device SGD, a limiter unit LIM, a sample and hold unit S_H and an evaluation unit EVAL. The data eye scan system is coupled with a transmitter TX and a receiver RX. The transmitter TX comprises a clock generator PLL, a test pattern generator PRBS and a feed forward equalizer FFE. The clock generator PLL is operable to generate a data clock signal DCLK with a data clock frequency f_DCLK. The data clock signal DCLK clocks the data transmission of a serial link. The clock generator PLL is coupled with the test pattern generator PRBS, with the feed forward equalizer FFE and with the signal generator device SGD. The test pattern generator PRBS is operable to generate a test pattern, for example a pseudo-random binary sequence. The test pattern is provided as an output signal SIG_PRBS of the test pattern generator PRBS. The output signal SIG_PRBS of the test pattern generator PRBS is filtered by the feed forward equalizer FFE. An output signal SIG_FFE of the feed forward equalizer FFE is fed into a first end of a transmission channel CHAN. A second end of the transmission channel CHAN is coupled with the receiver RX and with a data signal input IN_DAT of the sample and hold unit S_H. At the second end of the transmission channel CHAN a data signal DAT is received dependent on the transmitted filtered test pattern and the channel characteristics of the transmission channel CHAN. The transmission channel CHAN represents the serial link and particularly a high-speed serial link. For example, the data clock frequency f_DCLK amounts to 6.25 GHz. However, the data clock may as well be greater or less than 6.25 GHz. As an alternative to transmitting the filtered test pattern over the transmission channel CHAN, user data could be used.

The clock generator PLL is coupled with a clock input IN_CLK of the signal generator device SGD. The signal generator device SGD comprises two signal generator units SGU, that is a first sine generator SIN1 and a second sine generator SIN2. The clock input IN_CLK of the signal generator device SGD is coupled with a respective input of the first sine generator SIN1 and the second sine generator SIN2. The signal generator device SGD further comprises a frequency converter SSB. Outputs of the first sine generator SIN1 and the second sine generator SIN2 are coupled with inputs of the frequency converter SSB. An output of the frequency converter SSB is coupled with a periodic signal output OUT_SIG of the signal generator device SGD. The periodic signal output OUT_SIG is coupled with an input of the limiter unit LIM. At an output of the limiter unit LIM a sampling clock signal SCLK is provided. The output of the limiter unit LIM is coupled with a further input of the sample and hold unit S_H and with a first input of the evaluation unit EVAL. An output of the sample and hold unit S_H is coupled with a second input of the evaluation unit EVAL. The data signal DAT received at the second end of the transmission channel CHAN is sampled dependent on the sampling clock signal SCLK by the sample and hold unit S_H and is preferably digitized by the sample and hold unit S_H or by the evaluation unit EVAL. The evaluation unit EVAL may be operable to construct a data eye diagram dependent on the sampled data signal DAT and the sampling clock signal SCLK. For the construction of the data eye diagram the evaluation unit EVAL is preferably coupled with a computer PC. Alternatively the computer PC comprises the evaluation unit EVAL.

Figure 2:
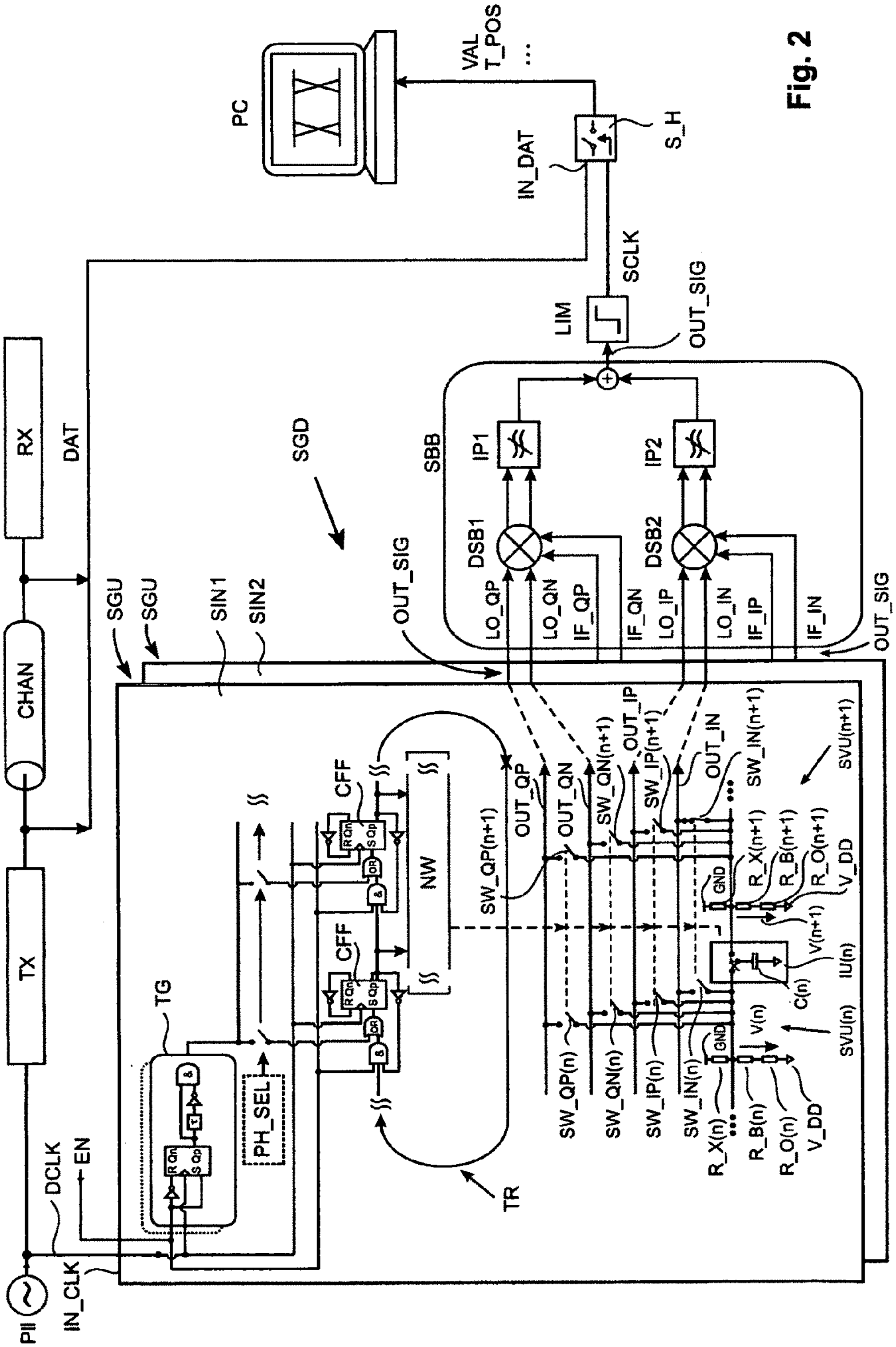
FIG. 2, a second block diagram of the data eye scan system.

FIG. 2 shows a more detailed second block diagram according to FIG. 1. Each signal generator unit SGU comprises at least one token generator TG and at least one token ring TR. The at least one token ring TR respectively comprises a predetermined number of positions. In the embodiment shown in FIG. 2, each signal generator unit SGU comprises one token ring TR and the token ring TR of the first sine generator SIN1 comprises a first predetermined number of positions N_LO and the token ring TR of the second sine generator SIN2 comprises a second predetermined number of positions N_IF. For example, the first predetermined number of positions N_LO amounts to 36 and the second predetermined number of positions N_IF amounts to 196. Each token ring TR comprises at each position at least one clocked flip flop CFF. Particularly, the clocked flip flops CFF are clocked RS flip flops. A clock input of each clocked flip flop CFF is coupled with the clock input IN_CLK of the signal generator device SGD. Preferably, a negative output of each clocked flip flop CFF is coupled with a reset-input of the same clocked flip flop CFF via a first inverter. A positive output of each clocked flip flop CFF is coupled via a second inverter, an and-gate and an or-gate with a set-input of the clocked flip flop CFF. Further, the positive output of each clocked flip flop CFF is coupled with the set-input of a respective following clocked flip flop CFF via the and-gate and the or-gate of the respective following clocked flip flop CFF. By this, the ring structure of the token ring is established.

Additionally, an enable signal EN may be coupled with the and-gate at each position and with the respective token generator TG of each signal generator unit SGU. By this, the respective token ring TR can only be active while the enable signal EN is logic high. The respective token generator TG is coupled with its output to the or-gate of at least one position of the corresponding token ring TR. Preferably, the at least one position is selectable for the respective token ring TR. Preferably, the at least one token generator TG is coupled with the or-gate of the at least one position dependent on a desired phase of the periodic signal generated by the respective signal generator unit SGU or the signal generator device SGD. A phase selector PH_SEL may be provided for selecting the desired phase of the generated periodic signal by closing one switch or more than one switch between the output of the respective token generator TG and the or-gates of the positions in the respective token ring TR that correspond to the desired phases of the generated periodic signals. By this, at least one token generated by the at least one token generator TG is injected at least one selected position in the at least one token ring TR.

In the embodiment shown in FIG. 2, each token is represented by a logical high state of the respective clocked flip flop CFF. The at least one token is generated by the at least one token generator TG after the enable signal EN is set to logic high. The respective token generator TG comprises a further clocked RS flip flop for synchronization of the enable signal EN with the data clock signal DCLK. The clock input of the further clocked RS flip flop is coupled with the clock input IN_CLK of the signal generator device SGD. The enable signal EN is fed to a reset-input of the further clocked RS flip flop via a third inverter and to the set-input. A positive output of the further clocked RS flip flop is coupled with a first input of a further and-gate. The positive output is further coupled with a second input of the further and-gate via a delay unit and a fourth inverter. A delay of the delay unit is chosen such that a short pulse no longer than two bit lengths with respect to the data transmitted over the transmission channel CHAN, that is with respect to the data clock frequency f_DCLK, is generated for each token generator TG.

At each position of the respective token ring TR the respective clocked flip flop CFF is set dependent on the data clock signal DCLK if one of two conditions is met. A first of the two conditions is fulfilled, if a token represented as a logic high from the at least one token generator TG is injected at the respective position. A second of the two conditions is fulfilled, if the respective clocked flip flop CFF is currently unset, the enable signal EN is logic high and the positive output of the respective preceding clocked flip flop in the respective token ring TR is currently set. Otherwise the respective clocked flip flop CFF is reset dependent on the data clock signal DCLK. By this, the at least one token injected in the at least one token ring TR is propagated from a current position to a following position in at least one token ring TR dependent on the data clock signal DCLK. The first condition refers to a startup of the signal generator device SGD while the second condition refers to a regular operation of the at least one token ring TR after the injection of the at least one token.

Particularly, the setting or resetting of the clocked flip flops CFF is performed with each rising and/or falling edge of the data clock signal DCLK. For example, two token rings TR with the same predetermined number of positions may be provided, wherein a first of the two token rings TR comprises at each of its positions at least one clocked flip flop CFF adapted to set or reset on each rising edge of the data clock signal DCLK and the second of the two token rings TR comprises at each of its positions at least one clocked flip flop CFF adapted to set or reset on each falling edge of the data clock signal DCLK. By this, both edges of the data clock signal DCLK are used to propagate the at least one token in each of the two token rings TR.

Each signal generator unit SGU further comprises a predetermined number of signal value units SVU. Preferably, the predetermined number of signal value units SVU is equal to the predetermined number of positions of the corresponding at least one token ring TR. Each signal value unit SVU represents a predetermined signal value of a predetermined signal waveform. In the embodiment shown in FIG. 2, the predetermined signal waveform is a sine waveform. Preferably, a sequence of all predetermined signal values is a time-discrete representation of one period of the sine waveform.

Each signal value unit SVU comprises at least one signal value switch and a voltage divider dimensioned to represent the corresponding predetermined signal value. In the embodiment shown in FIG. 2, each signal value unit SVU comprises four signal value switches, that is a positive in-phase switch SW_IP, a negative in-phase switch SW_IN, a positive quadrature-phase switch SW_QP and a negative quadrature-phase switch SW_QN. Each of these switches is coupled with the voltage divider of the respective signal value unit SVU. The respective predetermined signal value of the predetermined signal waveform is hardwired in the respective voltage divider. Preferably, each voltage divider comprises three resistors, that is a base resistor R_B, an offset resistor R_O and a signal swing resistor R_X. These resistors are arranged in series electrically between a supply voltage V_DD and a ground potential GND. A respective voltage V is provided at an output of each voltage divider as a voltage drop over the respective base resistor R_B and the respective offset resistor R_O. In a steady state the voltage V at a position referenced by n amounts to $$V(n)=V\_DD*(R\_B(n)+R\_O(n))/(R\_X(n)+R\_B(n)+R\_O(n)).$$

Each signal generator unit SGU comprises four outputs, that is a positive in-phase output OUT_IP, a negative in-phase output OUT_IN, a positive quadrature-phase output OUT_QP and a negative quadrature-phase output OUT_QN. Each of the signal value switches is coupled with the corresponding output of the signal generator unit SGU. Dependent on which of the signal value switches are closed the output voltages at the outputs of the respective signal generator unit SGU are set to the voltage V provided by the voltage divider of the corresponding signal value unit SVU and thus to the predetermined signal value of this signal value unit SVU.

The signal value switches of the signal value units SVU are controlled by a combinatorial network NW. The signal value switches are therefore coupled with outputs of the combinatorial network NW. Inputs of the combinatorial network NW are coupled with the positive outputs of all clocked flip flops CFF in the at least one token ring TR. The signal value switches of the signal value units are closed or opened dependent on a current position of the at least one token in the at least one token ring TR. By this, also the output voltages of the respective signal generator unit SGU depend on the current position of the at least one token in the at least one token ring TR. Because of the ring structure of the token ring TR the signal value units SVU are periodically activated and deactivated by switching at least one of their signal value switches on or off, respectively, and the resulting output signals at the outputs of the respective signal generator unit SGU each represent a time-discrete periodic signal, particularly a sine signal. A frequency of the generated sine signal depends on the data clock frequency f_DCLK of the data clock signal DCLK and on the predetermined number of positions in the at least one token ring TR. In this example, a first generated signal frequency f_LO of the sine signal generated by the first sine generator SIN1 amounts to $$f\_LO=f\_DCLK/N\_LO$$

and a second generated signal frequency f_IF of the sine signal generated by the second sine generator SIN2 amounts to $$f\_IF=f\_DCLK/N\_IF.$$

To achieve a smooth and time-continuous output signal an interpolation unit IU may be provided electrically between each of two consecutive signal value units SVU. The interpolator units IU are operable to interpolate between the predetermined signal values of the respective two consecutive signal value units SVU. Each interpolator unit IU preferably comprises an interpolator capacitor C and an interpolator switch SW_C. In a first switching state of the interpolator switch SW_C the interpolator capacitor C is electrically coupled with a first of the respective two consecutive signal value units SVU. The interpolator capacitor C is charged or discharged to the voltage V representing the predetermined signal value of the first of the respective two consecutive signal value units SVU. In a second switching state of the interpolator switch SW_C the interpolator capacitor C is electrically coupled with a second of the respective two consecutive signal value units SVU. The interpolator capacitor C is then charged or discharged to the voltage V representing the predetermined signal value of the second of the respective two consecutive signal value units SVU. The interpolation between the predetermined signal values of the respective two consecutive signal value units SVU is achieved by charging or discharging of the respective interpolator capacitor C.

Dependent on the current position of the at least one token in the at least one token ring TR the respective interpolator switch SW_C is switched from the first to the second switching state or vice versa. Particularly, the interpolator switch SW_C is switched from the first to the second switching state, if the first of the respective two consecutive signal value units SVU is deactivated and the second of the respective two consecutive signal value units SVU is activated to output its corresponding predetermined signal value. The interpolator switch SW_C is preferably switched back to the first switching state, if the second of the respective two consecutive signal value units SVU is deactivated. By the application of the interpolator unit IU an instantaneous voltage u(t) at a position referenced by n+1 is given by the following equation, if the signal value unit SVU at position n+1 is activated and the interpolator switch SW_C at a preceding position referenced by n is switched to its second switching state to couple with the signal value unit SVU at position n+1:

$$V(n+1)=V(n)*[1+R\_X(n+1)*C(n)/V\_DD*du(t)/dt],$$

with voltages V(n) and V(n+1) defined by the corresponding voltage divider as explained above. The expression du(t)/dt represents a derivative of the instantaneous voltage u(t) with respect to time t.

Preferably, the signal generator units SGU are operable to provide at each of their outputs signal values generated by distinct signal value units SVU that represent a predetermined phase difference with respect to the predetermined signal waveform. Preferably, with respect to the sine waveform chosen as the predetermined signal waveform, these phase differences represent a quarter period, that is 90 degrees, or half a period, that is 180 degrees. By this, differential in-phase output signals and differential quadrature-phase output signals can be generated with only one token ring TR and one sampled sine waveform represented by one set of signal value units SVU. The differential in-phase output signal is provided at the positive in-phase output OUT_IP and the negative in-phase output OUT_IN of the respective signal generator unit SGU. Accordingly, the quadrature-phase output signal is provided at the positive quadrature-phase output OUT_QP and the negative quadrature-phase output OUT_QN of the respective signal generator unit SGU.

The frequency converter SSB is preferably arranged as a single side band mixer with suppressed carrier. This is achieved by using two balanced mixers in a phasing type of mixer architecture. The frequency converter SSB preferably comprises a first double side band mixer DSB1 and a second double side band mixer DSB2. The first and the second double side band mixer DSB1, DSB2 are particularly a Gilbert cell double side band mixer. The advantage is that a Gilbert cell double side band mixer has a balanced topology. By this, the carrier and all even harmonics of the intermodulation products ideally are suppressed. The Gilbert cell double side band mixer uses biased input signals. This biasing and a signal swing are provided by the signal generator units SGU with the voltage dividers of the signal value units SVU dimensioned appropriately. The frequency converter SSB comprises a first positive in-phase input LO_IP, a first negative in-phase input LO_IN, a first positive quadrature-phase input LO_QP and a first negative quadrature-phase input LO_QN that are coupled with the corresponding outputs of the first sine generator SIN1. The frequency converter SSB further comprises a second positive in-phase input IF_IP, a second negative in-phase input IF_IN, a second positive quadrature-phase input IF_QP and a second negative quadrature-phase input IF_QN that are coupled with the corresponding outputs of the second sine generator SIN2. All quadrature-phase inputs are coupled with the first double side band mixer DSB1 and all in-phase inputs are coupled with the second double side band mixer DSB2.

The outputs of the first double side band mixer DSB1 and the second double side band mixer DSB2 are added to form the periodic signal provided at the periodic signal output OUT_SIG. The periodic output signals of the first sine generator SIN1 have the first generated signal frequency f_LO and the periodic output signals of the second sine generator SIN2 have the second generated signal frequency f_IF. Dependent on these different generated signal frequencies the periodic signal provided at the periodic signal output OUT_SIG of the frequency converter SSB has a third generated signal frequency f_RF which amounts either to $$f\_RF=f\_LO-f\_IF$$

for the lower side band or $$f\_RF=f\_LO+f\_IF$$

for the upper side band. In the embodiment shown in FIG. 2 the lower side band is assumed. Depending on the selected side band a scanning direction can be determined, that is the data eye is either scanned from left to right or from right to left.

A first interpolation filter IP1 and a second interpolation filter IP2 may be provided at the output of the first double side band mixer DSB1 or the second double side band mixer DSB2, respectively. The first and the second interpolation filter IP1, IP2 additionally or alternatively to the interpolation units IU in the signal generator units SGU smoothen the output signals of the first and the second double side band mixers DSB1, DSB2. An output capacitance of the respective double side band mixer may be adapted and utilized to implicitly carry out the interpolation filtering according to the respective interpolation filter. The respective output capacitance acts as an integrator.

By appropriately choosing the predetermined number of positions in the respective signal generator unit SGU and thus by choosing the first and the second generated signal frequency f_LO, f_IF, the third generated signal frequency f_RF can have a fractional relationship with respect to the data clock frequency f_DCLK, that is the data clock frequency f_DCLK divided by the third generated signal frequency f_RF is a non-integer, fractional number. For the application of the signal generator device SGD in the data eye scan system the periodic signal provided at the periodic signal output OUT_SIG should be a time-continuous sine signal to allow for a phase shift of the periodic signal with respect to the data clock signal DCLK. This assures that the sampling clock signal SCLK is asynchronous with respect to the data clock signal DCLK, that is an edge of the sampling clock signal SCLK can occur between two edges of the data clock signal DCLK, and thus enables asynchronous sampling of the data signal DAT. By this, the data signal DAT is sub-sampled and the data eye is scanned because of the fractional relationship between the third generated frequency f_RF and the data clock frequency f_DCLK. The data eye diagram can be constructed by processing multiple samples of the data signal DAT sampled dependent on the sampling clock signal SCLK.

FIG. 3 shows a first table with different configurations of the signal generator device SGD that are suited for application in the data eye scan system. In a first column a phase resolution PH_RES is given in degrees. In a second column a corresponding unit interval resolution UI_RES is given. The unit interval resolution UI_RES is calculated as the phase resolution PH_RES divided by 360 degrees. A unit interval represents a nominal bit length. The unit interval is divided into slices each of a width according to the unit interval resolution UI_RES. The eye diagram is scanned in equidistant steps of a fraction of the unit interval equal to the unit interval resolution UI_RES. In a third column the data clock frequency f_DCLK is given as 6.25 GHz. In a fourth column the first predetermined number of positions N_LO is given as the predetermined number of positions of the at least one token ring TR of the first sine generator SIN1. The resulting first generator signal frequency f_LO is not shown in the table but can be calculated as explained above. In a fifth column the second predetermined number of positions N_IF is given as the predetermined number of positions in the at least one token ring TR of the second sine generator SIN2. The resulting second generated signal frequency f_IF is not shown in the table but can be calculated as explained above. In a sixth column the resulting third generated signal frequency f_RF of the lower side band is given in Megahertz. It can be calculated as explained above. In a seventh column a number is given that represents the number of consecutive data bits in the data signal DAT that one sampling interval spans. This number can be calculated as the floor of the data clock frequency f_DCLK divided by the third generated signal frequency f_RF of the sampling clock signal SCLK. The unit interval resolution UI_RES can be calculated as a ratio of a period of the third generated signal frequency f_RF modulo a period of the data clock frequency f_DCLK and the period of the data clock frequency f_DCLK and thus allows for the asynchronous sampling of the data signal DAT. In an eighth column it is shown if the first predetermined number of positions N_LO and the second predetermined number of positions N_IF are dividable by four. If this is true, the configuration is particularly suitable for generating in-phase and quadrature-phase signals with the same signal generator unit SGU. The configurations shown in each line of the first table are alternative configurations for the implementation of the signal generator device SGD particularly for application in the data eye scan system.

Generally, for generating the asynchronous sampling clock signal SCLK the signal generator units SGU should comply with the following boundary conditions:

1) The data clock frequency f_DCLK divided by the frequency of the sampling clock, that is the third generated signal frequency f_RF, should be a fractional number for asynchronous sampling of the data signal DAT.

2) The periods given by the reciprocal of the first and the second generated signal frequency f_LO, f_IF, respectively, should be smaller than a predetermined number of data clock periods given by the reciprocal of the data clock frequency f_DCLK, preferably smaller than 500 data clock periods, in order to keep the area and power consumption of the signal generator unit SGD reasonably small.

3) The first and the second generated signal frequencies f_LO, f_IF should be chosen such that (a) 360 degrees divided by the unit interval resolution UI_RES is an integer, (b) the period of the sampling clock signal modulo the period of the data clock frequency f_DCLK divided by the period of the data clock frequency f_DCLK equals the desired unit interval resolution UI_RES, that is UI_RES=(1/f_RF mod 1/f_DCLK)*f_DCLK, (c) the first and the second predetermined number of positions N_LO, N_IF should be greater or equal to 36 to obtain a sufficient unit interval resolution UI_RES, (d) the first and the second predetermined number of positions N_LO, N_IF should be integers and (e) optionally the first and the second predetermined number of positions N_LO, N_IF are dividable by 4 to simplify the generation of in-phase and quadrature-phase signals and to keep area and power consumption small.

FIG. 4 shows a second table with an example for dimensioning the voltage dividers in the signal value units SVU of the first sine generator SIN1. In this example, a phase resolution PH_RES of 36 degrees is assumed. According to the first table shown in FIG. 3, the corresponding unit interval resolution UI_RES amounts to $$36°/360° = (1/(141.7234\ \text{MHz}) \bmod 1/(6.25\ \text{GHz}))/1/(6.25\ \text{GHz}) = 0.1$$

and the predetermined number of positions N_LO amounts to 36. Each line comprises the values for the voltage divider resistors of one of the 36 signal value units SVU. In a first column the position the respective signal value unit SVU corresponds to is referenced by n. In a second column a phase PH with respect to the sine waveform is given in degrees as $$PH(n) = n*360/N\_LO.$$

In a third column the resistor values for the respective base resistor R_B are given, in a fourth column the resistor values for the respective offset resistor R_O are given and in fifth column the resistor values for the respective signal swing resistor R_X are given in Ohm. Preferably, the resistor value for all base resistors R_B is equal, for example 10 kOhm. The base resistor R_B mainly determines a minimum resistance value of the voltage divider. This is advantageous for power saving and noise generation reasons. The offset resistor R_O and the signal swing resistor R_X can be calculated as follows:

$$R\_X(n) = R\_B*(1-A(n)*B)/(1+A(n)*B)$$

$$R\_O(n) = R\_B*[2/(1+A(n)*B)]*[V\_O/(V\_DD-V\_O)]$$

with $$A(n) = 0.99*\sin(2*\pi*PH(n)/360)$$

and B=0.6 that represents twice the amplitude of 0.3 of the desired sine signal, V_DD=1 V and V_0=0.005 that represents a voltage offset. All these values for calculating the resistor values can be chosen differently. In the same way the 196 voltage dividers in the signal value units SVU of the second sine generator SIN2 can be dimensioned. By selecting the resistor values of the offset resistor R_O and the signal swing resistor R_X appropriately an offset for biasing and the voltage swing of the generated sine signals can be adjusted by the first and the second double side band mixers DSB1, DSB2.

For example, assume that one token was first injected at the position referenced by n=5 and has then propagated for 6 positions in the token ring TR to position n=11. The clocked flip flop CFF at position n=11 currently holds the token, that is the positive output of the clocked flip flop at position n=11 is logic high and the positive output of all other clocked flip flops CFF in the token ring TR are logic low. For generating the differential in-phase and quadrature-phase signals the combinatorial network NW, which mainly comprises a set of switches and/or logic gates, switches the following signal value switches to an on-state: SW_IP(n=11), SW_IN(n=29), SW_QP(n=20) and SW_QN(N=2), and thus sets the outputs of the first sine generator SIN1 according to the predetermined signal value of the respective signal value unit SVU as follows:

$$OUT\_IP=V(n=11)$$

$$OUT\_IN=V(n=29)$$

$$OUT\_QP=V(n=20)$$

$$OUT\_QN=V(n=2).$$

All other signal value switches are switched to an off-state. With the next rising or falling edge of the data clock signal DCLK the token is propagated to the following position n=12 and accordingly the signal value switches at positions n=12, n=30, n=21 and n=3 are switched to the on-state in the same pattern as explained above and all other signal value switches are switched to the off-state. A modulo-360-degrees function is carried out automatically due to the ring topology of the token ring TR.

Figure 5:
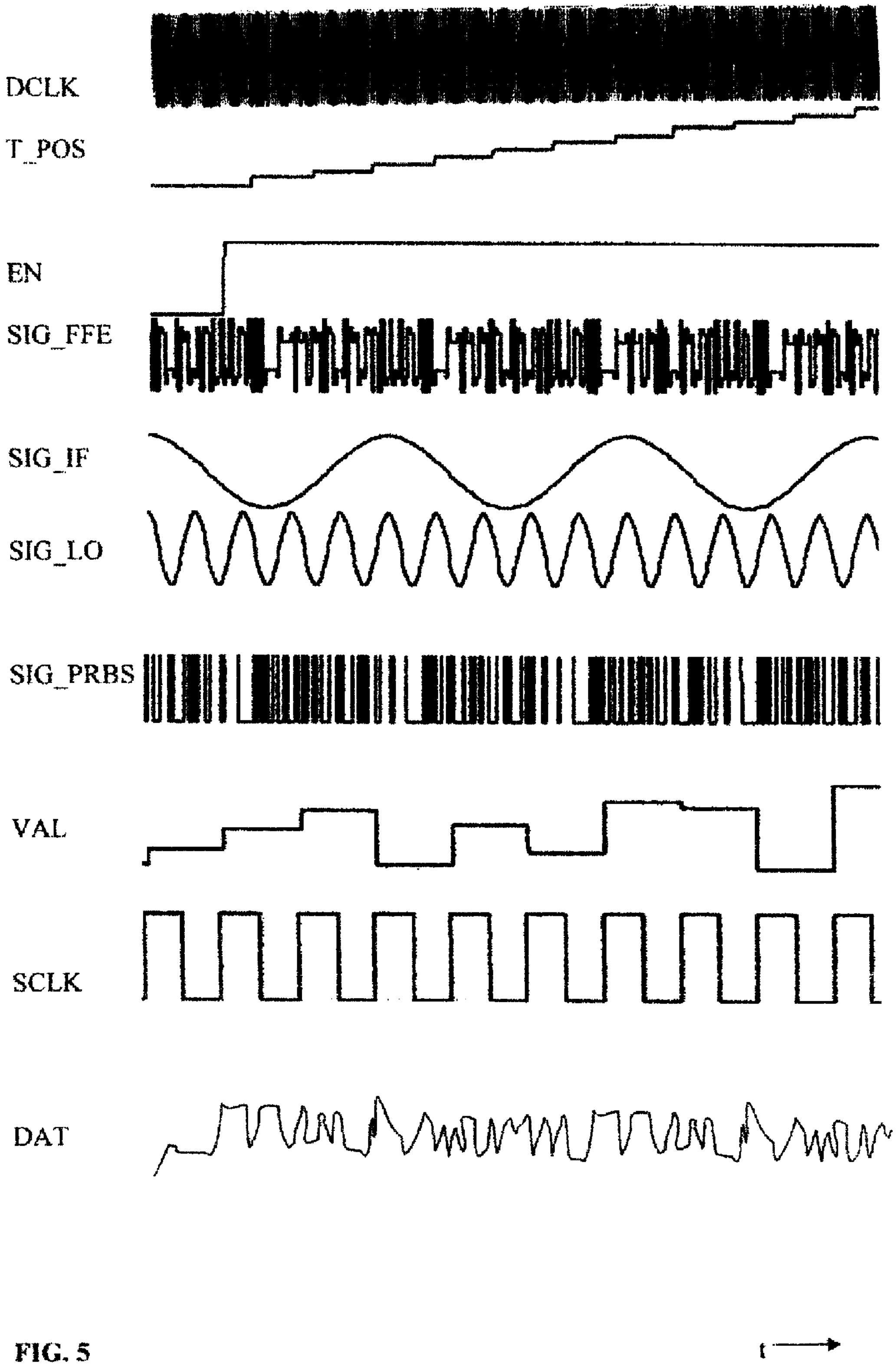
FIG. 5, signal diagrams.

FIG. 5 shows signal diagrams of a simulation of the data eye scan system. In the signal diagrams the data clock signal DCLK, a time position T_POS, the enable signal EN, the output signal SIG_FFE of the feed forward equalizer FFE, a first generated signal SIG_LO and a second generated signal SIG_IF, the output signal SIG_PRBS of the test pattern generator PRBS, a sampled data value VAL, the sampling clock SCLK and the data signal DAT are shown.

After the enable signal EN is set to logic high, for example by the computer PC, the time position T_POS is counted upwards with each rising edge of the sampling clock SCLK. The time position T_POS represents the current slice of the unit interval that is evaluated. The first generated signal SIG_LO and the second generated signal SIG_IF represent one of the differential in-phase or quadrature-phase output signals of the first sine generator SIN1 or the second sine generator SIN2, respectively. With each rising edge of the sampling clock SCLK the data signal DAT is sampled and evaluated, that is the data signal DAT is preferably digitized and represented by the sampled data value VAL. After one sampled data value VAL is acquired for each slice of the unit interval a counter providing the time position T_POS is reset (not shown) and preferably a sweep counter is increased by one. In the same way several sweeps are acquired and a data eye diagram is constructed from the acquired data dependent on the time position T_POS of each sampled data value VAL und the corresponding sampled data value VAL of all acquired sweeps.

By injecting the at least one token at different positions of the at least one token ring TR the phase of the generated periodic signals can be selected. Shifting the phase of the generated periodic signals of the first and/or the second sine generator SIN1, SIN2 results in a corresponding phase shift of the periodic signal provided at the periodic signal output OUT_SIG and thus also results in a phase shift of the sampling clock signal SCLK. This can be expressed by $$SIG\_LO(k)=\sin(2*\pi*k/N\_LO+2*\pi*dk\_LO/N\_LO)$$

$$SIG\_IF(k)=\sin(2*\pi*k/N\_IF+2*\pi*dk\_IF/N\_IF)$$

$$SIG\_RF(k)=\cos(2*\pi*k*(1/N\_LO+1/N\_IF)+2*\pi*(dk\_LO/N\_LO-dk\_IF/N\_IF))$$

with k representing discrete time, dk_LO a number of positions the injection point is shifted in the first sine generator SIN1, dk_IF a number of positions the injection point is shifted in the second sine generator SIN2, SIG_LO representing one of the sine signals generated by the first sine generator SIN1, SIG_IF representing one of the sine signals generated by the second sine generator SIN2 and SIG_RF representing a resulting signal provided at the periodic signal output OUT_SIG of the signal generator device SGD. The resulting phase shift amounts to 2*π*(dk_LO/N_LO−dk_IF/N_IF). This phase shift can be used to increase the unit interval resolution UI_RES because the sampling point of time is shifted accordingly. Multiple sweeps, each acquired with one of at least two different phases, are acquired and are used to construct a single data eye diagram with increased resolution.

A token may be represented by a predetermined binary sequence of logic states of at least two positions in the at least one token ring TR. The predetermined binary sequence of at least one token comprises at least two equal logic states representing an activated state. The activated state is preferably represented by logic high but may as well be represented by logic low if the at least one token ring TR is implemented with inverse logic. Each token in one token ring TR is coded by an individual binary sequence, for example '01' and '11' or '001' and '101'. Preferably, the logic states of at least two consecutive positions are respectively considered for determination of the respective token dependent on its individual binary sequence. The combinatorial network NW is operable to respectively associate at least two positions in the at least one token ring TR with at least one of at least two distinct signal value units SVU and/or signal outputs of the respective signal generator unit SGU dependent on the logic states of the at least two positions. Tokens in one token ring TR can be distinguished and recognized and the signal value switches and interpolator switches SW_C of the signal value units SVU can be controlled dependent on the current position of each individual token in the token ring TR. For example, one token with a first binary sequence, for example '101', represents with its current position in the token ring TR the current phase of the in-phase signal and another token with a second binary sequence, for example '001', represents with its current position in the same token ring TR the current phase of the quadrature-phase signal. The signal generated dependent on the token with the first binary sequence is provided at a first signal output of the signal generator unit SGU, that is the positive and/or negative in-phase output, and the signal generated dependent on the token with the second binary sequence is provided at a second signal output of the signal generator unit SGU, that is the positive and/or negative quadrature-phase output. In the same way, more than two different tokens can be propagated in the same token ring and can be distinguished from each other. In the case of generating in-phase and quadrature-phase signals the length of the at least one token ring TR in terms of the predetermined number of positions should allow for separating the token representing the current phase of the in-phase signal and the token representing the current phase of the quadrature-phase signal by a quarter of the token ring length or equivalently 90 degrees in case of the sine waveform. It is pointed out that it is not possible to propagate tokens comprising two or more logic high states at consecutive positions in the token ring TR, such as '11' or '111', with the embodiment shown in FIG. 2. The implementation of the at least one token ring TR could be modified to allow for propagating this kind of token.

The signal generator unit SGD may also be implemented with only one signal generator unit SGU and thus with only one sine generator. The sine signals of the other sine generator for operating the frequency converter SSB may be provided by a source external to the signal generator device SGD or the data eye scan system. By this, the generation of the periodic signal provided at the periodic signal output OUT_SIG can be influenced by the external source. For example, the externally provided sine signals may be generated dependent on an analog oscillator. These sine signals can be provided with a high quality. However, the sine signals generated by the signal generator unit SGU and fed to the frequency converter SSB still depend on the data clock signal DCLK in a deterministic way. By this, also the periodic signals provided at the periodic signal output OUT_SIG depend on the data clock signal DCLK in a deterministic way. Particularly, the third generated signal frequency f_RF still depends on the data clock frequency f_DCLK and changes accordingly.

In another embodiment of the signal generator device SGD, particularly for use in a different application than the data eye scan system, the signal generator unit SGD may be implemented with only one signal generator unit SGU, with two signal generator units SGU or with more than two signal generator units SGU. The at least one output of the respective signal generator unit SVU may be coupled with the periodic signal output OUT_SIG. The frequency converter SSB may be omitted. Further, the predetermined signal waveform may be chosen differently than the sine waveform. For example, the predetermined signal waveform may be chosen to represent a saw tooth waveform or a triangle waveform. The sample and hold unit S_H may then be triggered by this arbitrary waveform signal generated as described above and provided at the periodic signal output OUT_SIG when it crosses a predetermined voltage level, for example half of the supply voltage V_DD.

The invention claimed is:

1. A signal generator device for generating at least one periodic signal comprising
- a clock input;
- at least one output; and
- at least one signal generator unit coupled with the clock input and with the at least one output, said at least one signal generator unit comprising:
- at least one token ring with a predetermined number of positions, said at least one token ring being operable to propagate at least one token in the at least one token ring by moving the at least one token from a current position to a following position dependent on a clock signal provided at the clock input; and
- a predetermined number of signal value units that each represent a respective predetermined signal value of a predetermined signal waveform and that are operable to provide the respective predetermined signal value at at least one output of the signal generator unit dependent on a current position of the at least one token in the at least one token ring.

2. The signal generator device according to claim 1, wherein the at least one signal generator unit comprises at least two outputs and the at least one signal generator unit is operable to provide at the at least two outputs, at least two predetermined signal values generated in distinct signal value units that represent a predetermined phase difference with respect to the predetermined signal waveform.

3. The signal generator device according to claim 2, wherein the predetermined phase difference between the at least two predetermined signal values represents a quarter period of the pre-determined signal waveform.

4. The signal generator device according to claim 2, wherein the predetermined phase difference between the at least two predetermined signal values represents half a period of the predetermined signal waveform.

5. The signal generator device according to claim 2, wherein the at least one token ring comprises at least one clocked flip flop at each of the predetermined number of positions and the at least one clocked flip flop of each position has an input coupled to an output of the at least one clocked flip flop of the preceding position and has an output coupled to an input of the at least one clocked flip flop of the following position in the at least one token ring and the clock input of the signal generator device is coupled with a clock input of the clocked flip flops.

6. The signal generator device according to claim 5 comprising a first and a second token ring wherein the clocked flip flops of the first token ring are operable to propagate the at least one token on a rising edge of the clock signal or a signal derived from the clock signal and the clocked flip flops of the second token ring are operable to propagate the at least one token on a falling edge of the clock signal or the signal derived from the clock signal.

7. The signal generator device according to claim 5, wherein
- each signal value unit comprises a voltage divider that is dimensioned to provide an output voltage that represents the predetermined signal value of the respective signal value unit;
- each signal value unit comprises at least one signal value switch coupled with the output of the respective voltage divider and with the at least one output of the at least one signal generator unit and
- the at least one signal generator unit comprises a combinatorial network having inputs coupled with the outputs of clocked flip flops and having outputs coupled with the at least one signal value switch of each signal value unit.

8. The signal generator device according to claim 1, wherein
- at least one token in the at least one token ring is represented by a predetermined binary sequence of logic states of at least two positions in the at least one token ring and the predetermined binary sequence comprises at least two equal logic states representing an activated state and
- the at least one signal generator unit comprises a combinatorial network with inputs coupled at each position of the at least one token ring and outputs coupled with each signal value unit, said combinatorial network being operable to respectively associate at least two positions in the at least one token ring with at least one of at least two distinct signal value units dependent on the logic states of the at least two positions.

9. The signal generator device according to claim 1 wherein each signal value unit comprises a voltage divider that is dimensioned to provide an output voltage that represents the predetermined signal value of the respective signal value unit.

10. The signal generator device according to claim 9, wherein the voltage divider comprises a base resistor, an offset resistor and a signal swing resistor arranged in series and wherein voltage output from the voltage divider is provided at a node between the signal swing resistor and a serial arrangement of the base resistor and the offset resistor.

11. The signal generator device according to claim 1, wherein an interpolator unit is provided electrically between each of two consecutive signal value units and is operable to interpolate between the predetermined signal values of a first and a following second of the two consecutive signal value units.

12. The signal generator device according to claim 11, wherein each interpolator unit comprises an interpolator capacitor and an interpolator switch and each interpolator unit is operable to couple the interpolator capacitor with the first or with the second of the respective two consecutive signal value units dependent on the current position of the at least one token.

13. The signal generator device according to claim 1, wherein the at least one signal generator unit comprises a token generator coupled with the at least one token ring and wherein a phase of at least one generated periodic signal is selectable by injection of the at least one token at a corresponding position in the at least one token ring when starting the signal generation.

14. The signal generator device according to claim 1 that comprises at least two signal generator units having a different predetermined number of positions in the at least one token ring and a frequency converter, wherein the at least two signal generator units have outputs coupled to inputs of the frequency converter and an output of the frequency converter is coupled with the at least one output of the signal generator device.

15. The signal generator device according to claim 14, wherein the frequency converter comprises a single side band mixer with suppressed carrier signal for frequency conversion.

16. The signal generator device according to claim 14, wherein the frequency converter comprises at least one interpolation filter.

17. A data eye scan system comprising:

a scanner for scanning an eye in response to at least one periodic signal; and a signal generator device for generating at least one periodic signal comprising a clock input;

at least one output; and at least one signal generator unit coupled with the clock input and with the at least one output, said at least one signal generator unit comprising:

at least one token ring with a predetermined number of positions, said at least one token ring being operable to propagate at least one token in the at least one token ring by moving the at least one token from a current position to a following position dependent on a clock signal provided at the clock input; and a predetermined number of signal value units that each represent a respective predetermined signal value of a predetermined signal waveform and that are operable to provide the respective predetermined signal value at at least one output of the signal generator unit dependent on a current position of the at least one token in the at least one token ring.

* * * * *